Oct. 14, 1969  R. P. AYERST ET AL  3,472,371
SORTING FIBROUS MATERIAL
Filed Oct. 4, 1967
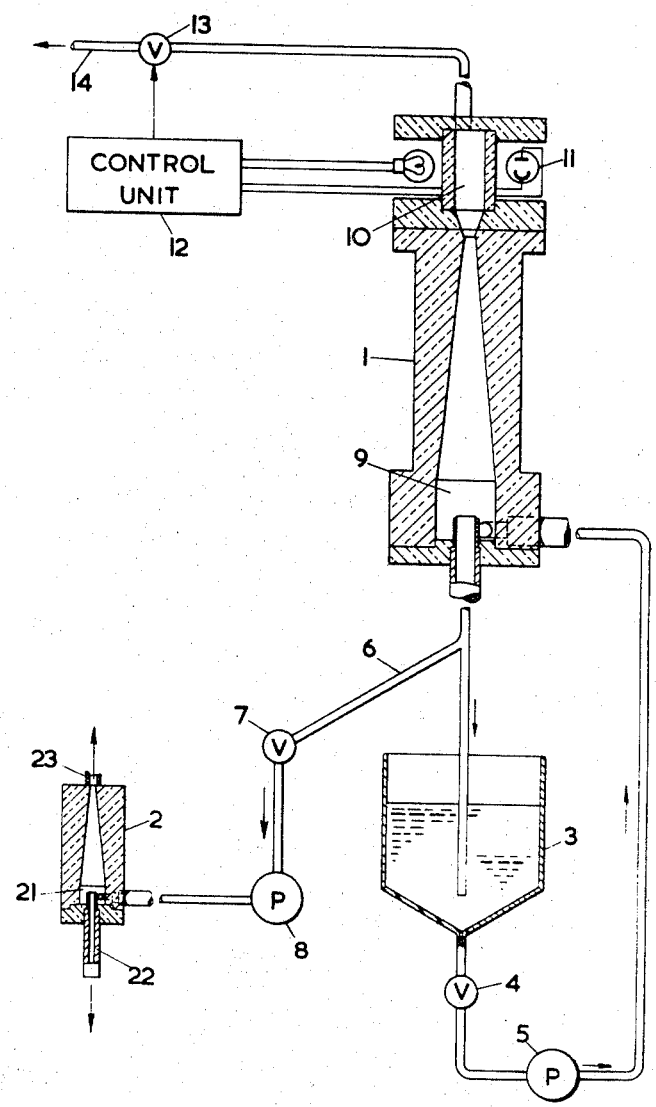
RONALD P. AYERST
PETER R. BILLINGS
*Inventors*
*Larson and Taylor*
Attorneys

United States Patent Office 3,472,371
Patented Oct. 14, 1969

3,472,371
SORTING FIBROUS MATERIAL
Ronald Percy Ayerst, 17 Stratfield Drive, Broxbourne, England, and Peter Robert Billings, 2 Sunnydene Ave., Ruislip, England
Filed Oct. 4, 1967, Ser. No. 672,913
Claims priority, application Great Britain, Oct. 4, 1966, 44,319/66
Int. Cl. B03b 3/45
U.S. Cl. 209—2          8 Claims

ABSTRACT OF THE DISCLOSURE

Fine fibers such as ceramic whiskers are separated from non-filamental contaminants of substantially the same density as the fibers and having a size range between the diameter and length of the fibers by subjecting a suspension thereof to a hydrocycloning step including recycle of the overflow fraction to the hydrocyclone.

---

The present invention relates to processes for sorting fibres, that is to say, processes wherein fibres within a given size range are separated from fibres outide this size range and/or from impurities such as dust or grit of a generally non-filamental shape.

Various processes have been proposed or used for separating ash or grit from fibres, including the use of elutriation columns and hydrocyclones in which the material is spun in a liquid in a cylindrical or conical chamber. When there is a distinct difference between the fibres and the impurity based on density and/or size, a satisfactory separation by any suitable process can generally be achieved without undue difficulty.

The present invention is concerned with the separation of fine fibres which are less than about 5 microns diameter and which may be only about 1 micron diameter from contaminants which include material of the same substance or are otherwise of similar density to the fine fibres, and which includes material having a size range, i.e. range of equivalent diameters, which are intermediate between the length and diameter of the fibres.

Examples of fine fibres with which the invention is concerned are whiskers of materials, such as silicon nitride, silicon carbide and aluminium oxide which are of the order of 1–2 microns diameter and 100 microns long, which are contaminated with massive grit, i.e. crystals of the same material and roughly spherical in shape with an equivalent diameter of the order of 50 microns, together with other impurities. Another example of fine fibres with which the invention is concerned are fine asbestos fibres which are about 1–5 microns diameter and 100–1,000 microns long and which are intermixed with coarser asbestos fibres and grit having an equivalent diameter generally between 10 and 100 microns.

Although hydrocyclones can effect a rapid separation or classification of suitable material, the movement of liquid in a hydrocyclone is very complex and strong forces act on any particles in the liquid. The behaviour of a solid particle in a hydrocyclone is dependent on both its size and density and their use for the separation of solid materials has hitherto tended to be restricted to materials in which the components to be separated have distinct differences in density and/or of size; so that provided they are of similar shape the separating effect of the various forces acting on particles in a hydrocyclone can be predicted with some certainty.

The orientation of non-spherical particles with respect to their direction of movement in the complex liquid movements and force fields in a hydrocyclone are however uncertain, and could vary from place to place in their passage through a hydrocyclone. For spherical or roughly spherical particles there are no problems with respect to orientation, but for filamental particles with which the invention is concerned having a high aspect ratio, the direction of orientation will have a profound effect on the effective particle size and hence the treatment of the particles in the hydrocyclone. It will be appreciated that variations in the direction of orientation of a filamental particle in a hydrocyclone would change its effective particle size in the course of its passage through the hydrocyclone with the result that fine fibres as hereinbefore described with which the invention is concerned could not be discriminated from contaminants of similar size range i.e. having a range of equivalent diameters intermediate between the length and diameter of the fine fibres.

We have found, however, that a hydrocyclone can be used to separate fine fibres from such contaminants without any significant damage to the fine fibres in spite of the high shear forces applied to particles in a hydrocyclone, and in accordance with the invention a process for separating or sorting fibres, especially, fine fibres as hereinbefore defined, from coarser fibres of the same or similar density and/or from contaminants of non-filamental shape but of the same or similar density and of similar size range, comprises forming fibrous material into a liquid dispersion, driving the dispersion into the tangential inlet of a hydrocyclone, and collecting the fine or relatively fine fibres discharged from the overflow outlet of the hydrocyclone. The discharge from the overflow may advantageously be recycled a desired number of times until the contaminants and/or coarser fibres have been reduced to a desired low concentration therein.

In accordance with a feature of the invention, a process for sorting fibres as above described in which the overflow discharge is recycled is provided with a hydrocyclone having an underflow pot or closed collecting chamber into which the contaminants accumulate. It has been found that the proportion of wanted fine fibres which would otherwise be discharged and lost through the underflow outlet of the hydrocyclone are substantially reduced by the presence of the underflow pot.

A hydrocyclone having an underflow pot and used in such a recycling process requires a control valve to discharge periodically the accumulated contaminants and/or coarser fibres from the underflow pot. A particular object of the invention is to provide a control arrangement for an underflow pot control valve which will provide information and/or terminate the recycling process when contaminants have been reduced to a desired low concentration in the fine fibre suspension recycling through the hydrocyclone.

In accordance with this provision of the invention, a hydrocyclone having an underflow pot equipped with a control valve is provided with a control arrangement having a sensing device which senses a property of the liquid content of the underflow pot such as its dielectric constant or opacity and which produces a control signal which is arranged to open the control valve for a short period sufficient to discharge the underflow pot when the property of the liquid in the underflow pot which is being sensed by the sensing device reaches a predetermined value through the accumulation of contaminants.

As the contaminants are progressively eliminated from the liquid recycling through the hydrocyclone, the time taken for the contaminants to accumulate to produce the predetermined value in the property being sensed to operate the sensing device will progressively increase. An assessment can be made of the interval between successive discharges which indicates that the concentration of contaminants has been reduced to a desired low concentration and when this interval is exceeded either the operation can terminate the recycling process or else a simple electrical timing circuit, to which the control signals produced by the sensing device are fed, can be provided to produce an output which will stop the circulation of the recycling liquid automatically.

By way of example, a process for storing fine fibres such as crystal whiskers or fine asbestos as hereinbefore described from coarser fibres and impurities will now be described with reference to the accompanying drawing which is an overall schematic diagram of the apparatus in which cross-sectional views of two hydrocyclones 1 and 2 are shown in a relatively larger scale.

The apparatus comprises a primary sorting system in which a liquid dispersion of fibres to be sorted can be circulated, which consists of the hydrocyclone 1, a feed vessel 3, a valve 4, a powerful pump 5 and interconnecting pipes. A further connecting pipe 6 leads through an isolating valve 7 to a fine sorting system which contains the small hydrocyclone 2 and its driving pump 8.

The operation of the primary sorting system is as follows. A prepared volume of a dispersion of unsorted uncleaned fibres laden with impurities is fed into the vessel 3. The circulatory system is isolated by closing the valve 7 and with the valve 4 open the powerful pump 5 is operated to drive the dispersion at high speed through the hydrocyclone 1. As the dispersion continuously recycles course fibres and impurities accumulate in the underflow pot 10 of the hydrocyclone. The underflow pot 10 is constructed with relatively thin walls made of a translucent material such as polymethylmethacrylate and light is arranged to be projected across the pot 10 to a photo-electric device 11 from an electrical control unit 12. The control unit 12 controls a valve 13 in a discharge pipe from the pot 10 and when the light which reaches the device 11 is reduced to a predetermined value because of the accumulation of coarse fibres and impurities in the pot 10, the control unit 12 is arranged to open the valve 13 for a short period of time just sufficient to discharge the contents of the pot 10 through a discharge pipe 14.

Continuing circulation of the liquid dispersion causes the coarser material to accumulate in and be discharged repeatedly from the pot 10 in this way until the concentration of these impurities in the circulating dispersion is considerably reduced. This causes progressively a considerable increase in the time for the impurities to accumulate to the level necessary for the control unit 12 to operate.

The time intervals between successive discharges of the pot 10 is a good indication of the concentration of unwanted material remaining in the circulating dispersion and when the interval exceeds a pre-assessed time period the circulation of the dispersion through the primary sorting system is terminated either by an operator or by an automatic timing control system not shown in the drawing which would cut off the power supply to the pump 5.

For various applications, the elimination of coarse fibres and impurities may be sufficient and the required dispersion as purified by the primary sorting system may be collected from the vessel 3. Thus, for example, the hydrocyclone 1 can be constructed as shown in the drawing having a cylindrical head 9 to its cyclone chamber which is 1 inch in diameter and the pump 5 arranged to drive the dispersion into the hydrocyclone at such a speed that non-filamental impurities greater than about 5 microns in equivalent diameter and relatively coarse fibres having a diameter greater than 5 microns are discharged through the underflow outlet.

In accordance with a further important feature of the invention, the apparatus shown in the drawing is capable of further sorting the fine fibres such as whiskers or asbestos fibres of less than 5 microns diameter to obtain a collection of very fine fibres of about 1–2 microns diameter. This is carried out by opening the valve 7 with the valve 4 closed and drawing the liquid dispersion from the vessel 3 by the powerful pump 8 at a very high velocity into the small hydrocyclone 2. With the hydrocyclone constructed as shown with 1 cm. diameter cylindrical head 21 to its cyclone chamber, the dispersion can be driven into the hydrocyclone at sufficient velocity to cause very fine fibres having a diameter of 1–2 microns to be discharged through the overflow outlet 22 and the remaining fibres of about 3–5 microns diameter to be discharged through the underflow outlet 23.

We claim:

1. A process for separating fine fibers having a diameter of not more than 5 microns and having a length to diameter ratio of from about 20 to about 1000 from contaminants of non-filamental shape having at least substantially the same density as said fibres and having a size range between the diameter and length of said fine fibers comprising the steps of introducing a liquid feed dispersion containing said fibers and contaminants into the tangential inlet of a hydrocyclone, collecting an overflow liquid product from said hydrocyclone comprising a liquid dispersion containing said fine fibers, and having a reduced concentration of said contaminants therein relative to said liquid feed dispersion, and collecting an underflow product from said hydrocyclone comprising a liquid dispersion containing said contaminants and having an increased concentration of said contaminants therein relative to said liquid feed dispersion.

2. A process according to claim 1 wherein said fine fibers have a diameter of from 1 to 5 microns and a length of from 100 to 1000 microns.

3. A process according to claim 1 wherein said fibers are asbestos fibers.

4. A process according to claim 1 wherein said fine fibers are fine crystalline ceramic whiskers.

5. A process according to claim 4 wherein said whiskers are selected from the group consisting of silicon nitride, silicon carbide, and aluminum oxide.

6. A process according to claim 1 wherein said overflow product is recycled through said hydrocyclone to further reduce the concentration of contaminants therein.

7. A process according to claim 6 wherein the underflow product is collected in a chamber adjacent to the underflow discharge of the hydrocyclone and said product is periodically discharged from said chamber.

8. A process according to claim 1 wherein the liquid feed dispersion is introduced to the bottom portion of a hydrocyclone which tapers inwardly upwardly.

References Cited

UNITED STATES PATENTS

| | | | |
|---|---|---|---|
| 2,295,366 | 9/1942 | Stout | 209—1 |
| 2,312,706 | 3/1943 | Freeman | 209—211 |
| 2,377,524 | 6/1945 | Samson | 209—211 |
| 2,668,620 | 2/1954 | Fontein | 209—211 |
| 2,735,547 | 2/1956 | Vissac | 209—211 |
| 2,975,896 | 3/1961 | Hirsch | 209—211 |
| 2,982,409 | 5/1961 | Boadway | 209—211 |
| 3,166,496 | 1/1965 | Kelsall | 209—211 |
| 3,206,917 | 9/1965 | Kaiser | 55—41 |
| 3,306,444 | 2/1967 | Troland | 209—211 |
| 3,352,745 | 11/1967 | Malm | 209—211 X |

FRANK W. LUTTER, Primary Examiner

U.S. Cl. X.R.

209—211